March 17, 1931.                 G. E. BALDWIN                 1,797,167
                         AUTOMATIC TRAIN PIPE CONNECTER
                   Original Filed Nov. 14, 1919    3 Sheets-Sheet 1
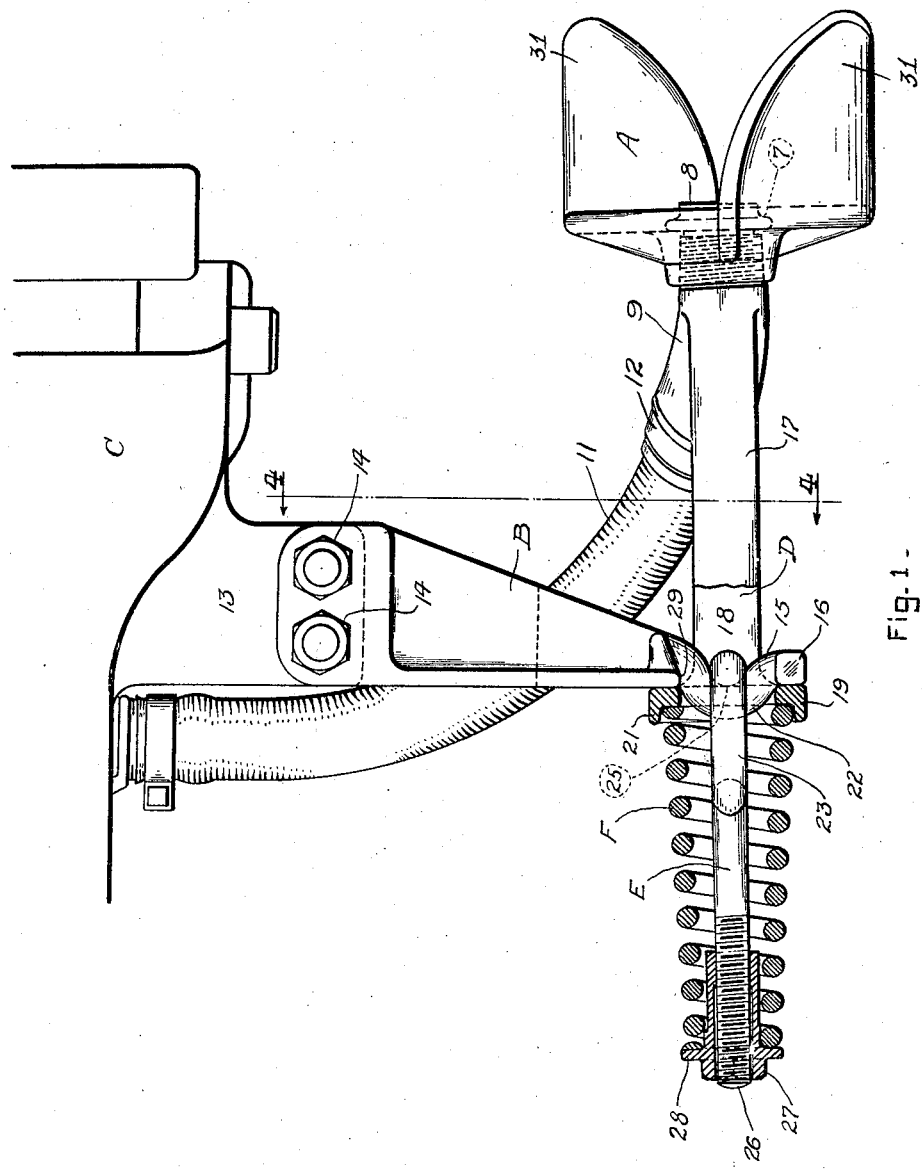

March 17, 1931. G. E. BALDWIN 1,797,167
AUTOMATIC TRAIN PIPE CONNECTER
Original Filed Nov. 14, 1919  3 Sheets-Sheet 2
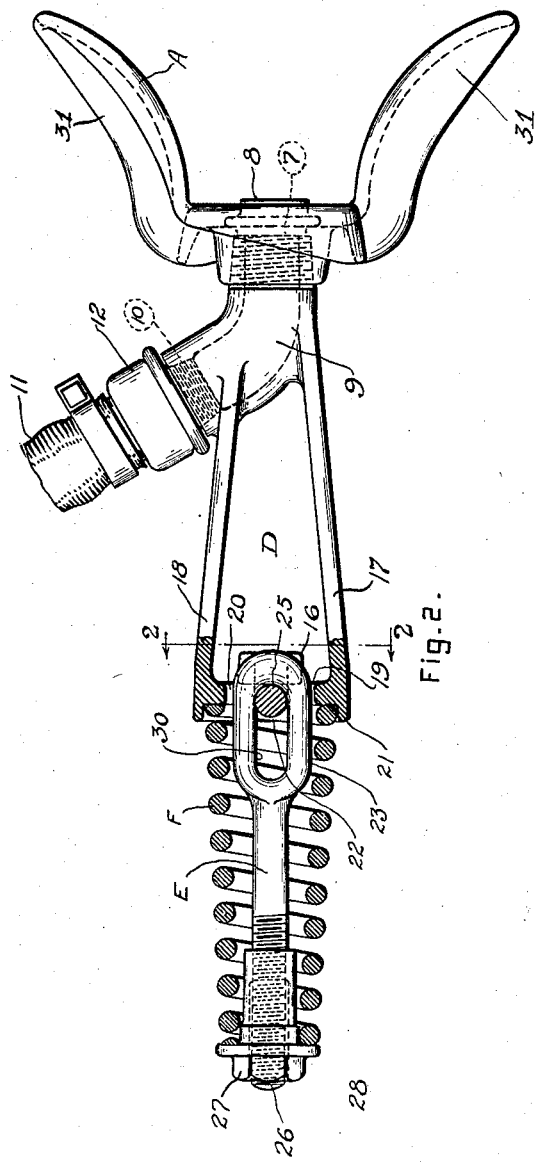

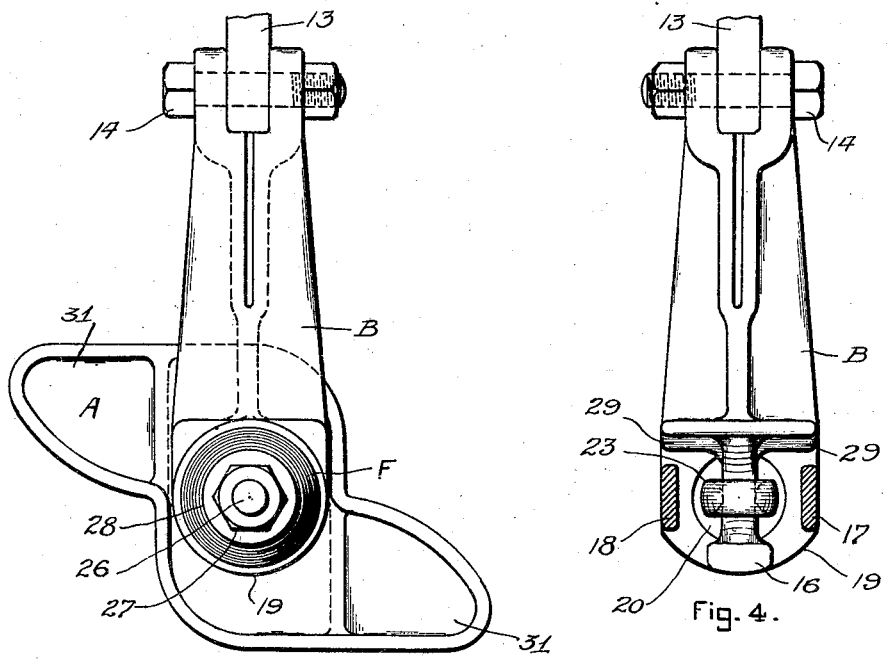

Patented Mar. 17, 1931

1,797,167

UNITED STATES PATENT OFFICE

GEORGE E. BALDWIN, OF LIMA, OHIO, ASSIGNOR TO JOSEPH V. ROBINSON, OF NEW YORK, N. Y.

AUTOMATIC TRAIN-PIPE CONNECTER

Application filed November 14, 1919, Serial No. 338,103. Renewed March 30, 1929.

My invention relates to improvements in automatic connecters for coupling train pipes between railways cars, and an object of the invention is to provide improved means for supporting the coupling head of the connecter for universal movement with the minimum resistance to such movement, thus ensuring that the connection between the mated couplings comprising my improvement will remain air tight under all operative conditions of service, and that the sharp whipping movement of cars when running over rough track will be absorbed by my improvement and thus prevented from causing mated coupling heads to move one upon another. Much difficulty has been encountered heretofore in overcoming the tendency of mated coupling heads to thus move, such movement being caused generally by the failure of the universal support for the heads to respond instantly and freely and thus allow the heads to accommodate themseves to the various positions which cars in service assume. My improvement effectively overcomes this difficulty, and consists in the arrangements, combinations, and constructions described in the following specification, and pointed out in the annexed claims, and illustrated in the accompanying drawings in which—

Figure 1 is a sectional elevation of my improved support showing it applied to the car coupler of a car.

Figure 2 is a longitudinal sectional plan view of my improvement.

Figure 3 is a rear view of the structure shown in Figures 1 and 2.

Figure 4 is a front view of my improvement taken on the line 2—2 of Figure 2.

Figure 5 is a rear view of the bracket member B of my improvement, and

Figure 6 is a front view of the bracket B.

Referring to the drawings: Any satisfactory form of coupling head A having a port or aperture 7 in which a gasket 8 is mounted, may in any suitable manner be connected with the conduit 9 of my improved support, but I preferably connect it as by means of threads as shown. The conduit 9 curves laterally of said head at the rear thereof and terminates preferably in a threaded portion 10 to which the train pipe hose 11 of the car is attached as by a fitting 12, or it may be otherwise satisfactorily attached. When the hose is secured in place the fluid therein will of course be directed to the coupling head A.

To support the coupling head for universal movement, whereby it may readily accommodate itself to the various movements of cars in service, I provide a base or bracket B which is forked at its upper end as shown, and is suitably connected to a lug 13 of the car coupler C as by bolts 14. The bracket carries at its lower end a vertically extending cylindrically formed, or flared, projection or device 15, which is curved in both the vertical and horizontal planes and which is preferably integral with the bracket and round in cross section, as shown particularly in Figures 1 and 2, tho it may be constructed separate of the bracket and suitably secured to the lower end thereof. The projection is located on substantially the vertical center line of the bracket B and is provided at its lower end with lugs 16 formed integrally therewith, the rear face of said lugs being in the plane of the rear side of the bracket B. It will be observed that that portion of the bracket from which the projection 15 extends is considerably wider than the rear face of said lugs. Thus the contact between the flange or portion 19 of the head-supporting body—hereinafter described—and the bracket B above said vertically curved portion of the device 15 is of greater extent than the contact thereof below said portion.

From the conduit 9 spaced straps, or means, 17 and 18 extend to the rear of the bracket B and are joined thereat by a transversely extending portion or projection or flange 19 which is provided with an opening 20 and an annular seat 21, the opening 20 being of sufficient diameter to embrace the vertically curved portion 22 of the projection or device 15. Though they may be otherwise connected I show the flange or portion 19 and the straps 17 and 18 as formed integrally with the conduit 9 which construction may be said to constitute a hollow head-supporting body D into which the bracket B and the projection 15 extend as shown.

To resiliently support the coupling head A for universal movement I provide a member or tie-rod E having an open end or perforated head 23, the forward inner wall or face 24 of which is preferably cylindrically formed in cross section as shown in Figures 1 and 2. I mount this tie rod or member on the projection or device 15 with its cylindrically formed face 24 seated in the curved complementary seat 25 of said device upon which seat said tie rod or member may move universally relative to the device and the bracket B. The bottom surface of the seat 25 is preferably in substantially the same vertical plane as the rear surface of the parts 16 and 29 of the bracket B against which the portion 19 contacts, or, if desired, the seat may be positioned either rearwardly or forwardly of such plane. This arrangement of parts facilitates free lateral movement of the tie rod and body D relative to the bracket without jamming or binding against the latter. The head 23 of the member or tie rod E extends through the opening 20 of the flange or portion 19 into the hollow body D and beyond the bracket B, while the rear end 26 thereof lies behind the bracket B and carries a nut 27 having an abutment 28, the nut and the abutment being adjustably mounted on the member E as by threads as shown.

A spiral conical buffer spring F surrounds the member E and is interposed between the flange or projection 19 and the abutment 28 with its large end resting in the seat 21 on the flange and its small end bearing against said abutment. The spring is normally under sufficient compression to hold the flange or portion 19 against the rear side of the bracket B and maintain the coupling head A at the limit of its forward movement relative to said bracket and in proper position to contact with a similar head on an adjacent car.

Undue rotation of the coupling head A about its longitudinal axis is prevented by contact of the upper edges of the straps 17 and 18 with the corners 29 of the bracket B, while accidental dislodgement of the member E from its seat 25 on the device or projection 15 is prevented by the tension of the spring F. The head 23 of the member E is provided with an elongated slot 30 so that it may be passed over the lugs 16, on the device 15, from one side of the bracket B in assembling. It will be observed that the longitudinal center line of the device 15 is disposed at a right angle to the longitudinal center line of the member E and the fluid conduit 9.

It will be understood that by removing nut 27 and spring F from the member E, the head A can be withdrawn from its mating head, while two cars are coupled in service. When the heads are thus separated, the member E can be rotated on the bracket until the slot 30 thereof is alined with the lugs 16 of the bracket, when this member and the hollow body D may be removed downwardly from the bracket.

The foregoing construction produces an efficient improved support by which the coupling head A will be supported for universal movement with the minimum resistance to such movement. Through the medium of the guides 31 of the coupling head A opposing connecters are aligned as the cars couple, the gasket 8 and the port 7 of one head mating and aligning with those of the other. This contact takes place in advance of the full coupling of the cars so that as the car couplers C move into final engagement the body D of the connecter by reason of the engagement of the coupling head A with a mating head is moved rearwardly against the tension of the buffer spring F, the flange 19 being thereby carried away from the rear side of the base or bracket B. This operation removes the resistance which the spring F offers to lateral movement of the coupling head from the normal uncoupled position, and produces what may be termed a floating support for the coupled heads, inasmuch as no resistance to lateral movement of the heads when coupled is presented by the support except the very slight frictional resistance occurring at the connection between the projection 15 and the member or tie rod E. Also when two heads are thus brought together and the coiled springs F compressed, the front ends of these springs will flex and yield so that the heads and supporting members therefor will be capable of substantial movement in a vertical plane relative to the bracket and with substantially no movement or only slight movement of the tie rods. With a construction of this character the sharp whipping motion of cars running over rough track, which motion tends always to move the heads relatively, cannot get through the support to the coupling heads A but is lost at the universal joint between the device 15 and the member E, thus allowing the full resistance of the spring F to be directed to the important and essential function of holding the faces of mated coupling heads in tight engagement with the ports thereof in proper alignment. Furthermore, the arrangement described is such that the body D, including the members 17 and 18 thereof, the tie rod E and spring F is capable of rotation as a whole in either direction around the lower end of the bracket B. The transversely extending lugs and portions 29 respectively above and below the members 17 and 18 are so proportioned as to facilitate such rotary movement. This capability of operation is important because the car couplers of adjacent cars sometimes slip past each other in the coupling operation because the cars are not in alignment, with the result that the automatic connecter heads are forced around into position at right angles or transverse to the track. The present arrangement permits the parts to assume such abnormal position without being bent or broken.

I am aware that changes may be made in my improvements, and that the projection 15 and the head 23 of the member E may be made in various shapes in cross section, as for instance rectangular, but I have illustrated a very efficient and satisfactory form, though I do not desire to be limited to the exact construction disclosed.

What I claim as new and desire to secure by Letters Patent is:

1. In an automatic train pipe connecter, a bracket having a portion rigid therewith at its lower end provided with a seat on its front face, a coupling head, a body secured thereto and extending rearwardly and having a portion adapted to contact with the rear face of the bracket, a member pivotally engaging said seat, and a spring supported on said member for yieldingly holding the same to said seat and said body against the bracket.

2. In an automatic train pipe connecter, a bracket having a portion rigid therewith at its lower end, said portion having a seat on its front face, a coupling head, a body secured thereto and extending rearwardly and having a portion adapted to contact with the rear face of the bracket, a member pivotally engaging said seat and extending rearwardly of the bracket, a spring mounted on said member and engaging the rear portion of said body for holding the same against the bracket.

3. In an automatic train pipe connecter, a bracket having a vertically arranged integral portion at its lower end, a coupling head, a body secured thereto and extending rearwardly and having a portion adapted to contact with the rear face of the bracket, a tie rod surrounding and pivotally engaging said vertically arranged portion of the bracket, a spring supported by said tie rod and engaging the rear portion of said body for holding the same against the bracket.

4. In an automatic train pipe connecter, a bracket having a substantially cylindrical portion at its lower end, a coupling head, a body secured thereto and extending rearwardly and having a portion adapted to contact with the rear face of the bracket, a tie rod engaging the front face of said cylindrical portion of the bracket and extending rearwardly of the bracket, a coiled spring supported by said tie rod and engaging the rear portion of said body for holding the same against the bracket.

5. In an automatic train pipe connecter, a bracket having a rigid portion at its lower end provided with a seat on its front face, a coupling head, a body secured thereto and extending rearwardly and having a portion adapted to contact with the rear face of the bracket, said body comprising spaced members arranged on opposite sides of said bracket and spaced a sufficient distance to permit removal of said body downwardly from said bracket, a tie rod engaging said seat on the rigid portion of the bracket and extending rearwardly of the same, and a coiled spring supported by said tie rod and engaging said body for holding the same against the bracket.

6. In an automatic train pipe connecter, a bracket having a vertically arranged portion at its lower end, said portion having a depression on its front face, a coupling head, a body secured thereto and extending rearwardly and having a portion adapted to contact with the rear face of the bracket, a tie rod surrounding said vertically arranged portion of the bracket and engaging the depression in the front face thereof, said tie rod extending rearwardly of said bracket, and a coiled spring surrounding the tie rod and engaging the rear portion of said body for holding the same against the bracket.

7. In an automatic train pipe connecter, a bracket having a vertically arranged portion at its lower end, said portion having a depression on its front face and having a lateral projection at its lower end, a tie rod extending rearwardly of said bracket and having an eye through which said vertically arranged portion of the bracket projects, the front end of the eye in said tie rod engaging said depression in the front face of the bracket, a coupling head, a pair of spaced members secured to said head and extending rearwardly on opposite sides of said bracket, a flange carried by said members for engaging the rear face of the bracket, and a coiled spring supported by said tie rod and engaging said flange for holding the same in contact with the bracket.

8. In an automatic train pipe connecter, a bracket having at its lower end a vertically arranged integral portion, said portion having a seat on its front face, a tie rod engaging said seat and extending rearwardly of said bracket, a coupling head, a pair of spaced members extending rearwardly of said head and arranged on opposite sides of the vertically arranged portion of said bracket, a flange carried by said members adapted to contact with the rear face of the bracket, an abutment on the rear end of said tie rod, and a coiled spring supported by said tie rod and arranged between said abutment and said flange for yieldingly holding the latter against the bracket.

9. In an automatic train pipe connecter, the combination of a coupling head, a member secured thereto and extending rearwardly and having therein an elongated opening, a projection at the rear end of said member, a car coupler, a bracket rigidly secured to the car coupler and having at its lower end an elongated portion which extends downward ly into the opening in said member, a device engaging the front face of said elongated portion of the bracket for rocking movement thereon, and a spring supported by said device for extending said coupling head with said projection normally engaging the rear side of said bracket.

10. In an automatic train pipe connecter, the combination with a car coupler of a bracket rigidly secured thereto and extending downwardly therefrom, the bracket being provided at its lower end with an elongated portion, a coupling head, a member secured to said head and extending rearwardly thereof, said member comprising spaced portions which span said elongated portion of the bracket, a projection on the rear end of said member, a device pivotally supported upon the front face of said elongated portion of the bracket for rocking movement thereon, and a spring for maintaining said device in position and for extending said coupling head with said projection normally engaging the rear side of said bracket.

11. In an automatic train pipe connecter, in combination, a car coupler, a bracket rigidly secured to said coupler and extending downwardly therefrom, said bracket being provided at its lower end with a downwardly extending elongated portion having a curved seat on its front face, a coupling head, a member secured thereto and extending rearwardly and having a portion adapted to contact with the rear face of the bracket, a tie rod pivotally engaging said elongated portion of the bracket for rocking movement on said seat, a spring surrounding said tie rod and engaging the rear portion of said member for holding the same against the bracket.

12. In an automatic train pipe connecter, a car coupler, a bracket rigidly secured thereto and extending downwardly therefrom and having a downwardly extended elongated portion at its lower end, said elongated portion having a seat on its front face, a coupling head, a member secured thereto and extending rearwardly and having a portion adapted to contact with the rear face of the bracket, a tie rod engaging said elongated portion of the bracket and positioned on said seat, said tie rod extending rearwardly of the bracket, and a spring supported by said rod and engaging the rear portion of said member for holding the same against the bracket.

13. In an automatic train pipe connecter, a bracket having at its lower end a downwardly extending elongated portion having a curved seat on its front face, a coupling head, a member secured to said head and extending rearwardly on opposite sides of said elongated portion of the bracket, said member being provided with a projection for engaging the rear side of said bracket, a device engaging said seat on the bracket for rocking movement relative thereto, a spring carried by said device and acting to maintain said projection against the rear face of the bracket.

14. In an automatic train pipe connecter, the combination of a coupling head, a member secured thereto and extending rearwardly and having therein an elongated opening, said member also having a portion adapted to engage the rear side of the bracket, a car coupler, a bracket rigidly secured to said car coupler and having an elongated portion at its lower end, which portion extends downwardly into the opening in said member, a device engaging the front surface of said elongated portion of the bracket and extending rearwardly thereof, a spring mounted on said device for holding said member in engagement with the bracket, said member and said device being removable from the bracket while said car coupler is connected to a mating coupler.

15. In an automatic train pipe connecter, the combination of a coupling head, a member secured thereto and extending rearwardly and having therein an elongated opening, said member also having a portion adapted to engage the rear side of the bracket, a car coupler, a bracket rigidly secured to said car coupler and having a portion at its lower end which extends downwardly into the opening in said member, a device extending rearwardly from said bracket, said device also having an opening through which said portion of the bracket extends, a spring mounted on said device and engaging said member for pressing the same towards said bracket, the openings in said member and said device being so arranged as to permit said member and device to be removed downwardly from said bracket while said car coupler is connected to a mating coupler.

16. In an automatic train pipe connecter, the combination of a coupling head, a bracket having a seat on its front surface, a member spanning said bracket and connected with said coupling head, said member being provided with an opening, a projection rigid with the bracket and extending into said opening to support the rear end of said member against vertical shifting on the bracket when in the normal uncoupled position, a tie rod engaging said seat and extending rearwardly of said bracket, said tie rod having universal movement on said seat, a coiled spring supported by said tie rod and engaging said member to yieldingly sustain said coupling head in front of said bracket, and means cooperating with the tie rod to secure said spring in place.

17. In an automatic train pipe connecter, the combination of a coupling head, a bracket having at its lower end a portion the front surface of which forms a seat for a tie rod, a member spanning said bracket and connected with said coupling head, a tie rod extending into said member and engaging said seat, said tie rod having universal movement on said seat, a spring surrounding said tie rod and anchored thereto for yieldingly sustaining said coupling head, and said bracket having portions extending away from opposite sides thereof to prevent undue rotation of said member relative to the bracket.

18. In an automatic train pipe connecter, the combination of a coupling head, a flange having an opening therein, means connecting said flange and said head, a bracket the rear side of which rests normally against said flange, the bracket having a rigid projection extending downwardly from its lower end, and a pivot member extending through the opening in said flange and embracing the projection on said bracket, said member and said bracket co-operating to prevent undue vertical shifting of said flange and a spring for extending said coupling head.

19. In an automatic train pipe connecter, the combination of a coupling head, a flange having a perforation, means connecting said flange with said head, a bracket having at its lower end a downwardly extending rigid projection, a pivot member projecting through the opening in said flange and embracing the projection of said bracket and acting to maintain said flange in proper service position and to permit universal movement of said head relative to said bracket, an abutment carried at one end of said pivot member, and a spring interposed between said abutment and said flange for maintaining said coupling head at the limit of its forward movement.

20. In an automatic train pipe coupling, the combination of a coupling head, a vertically extending projection at the rear of said head, spaced members connecting said projection and said head, a bracket the lower part of which carries a vertically disposed portion the side walls of which diverge upwardly from an intermediate point and which is positioned between said spaced members and lies in front of said projection and contacts therewith, a seat on the rear of said vertically extending projection and having an opening, a pivot device extending through said opening and embracing said vertically disposed portion of the bracket, the contacting faces of said pivot device and said vertically disposed portion of the bracket diverging in different directions from their point of contact, and a spring acting against said vertically extending projection to extend said coupling head.

21. In an automatic train pipe coupling, the combination of a coupling head, spaced members secured to said head and provided at their rear ends with a perforated flange, a bracket rigidly secured in position the lower end of which extends downwardly between said spaced members, said lower end of said bracket being provided with a bearing portion, a pivot device extending through the opening in said flange and having a perforated head which embraces said bearing portion of the bracket said bearing portion having side walls which diverge upwardly from the point at which said pivot device engages said bearing portion and also having a front wall which diverges rearwardly from the point at which said pivot device engages said bearing portion, a spring surrounding said pivot device and bearing upon said flange to extend said coupling head with said flange resting against the rear side of said bracket, and means for maintaining said spring in position.

22. In an automatic train pipe coupling, the combination of a coupling head, a pair of spaced members connected to said head and extending rearwardly thereof the inner faces of which members lie in substantially vertical planes, a flange secured to said spaced members, a bracket the lower end of which extends downwardly between said spaced members and which is provided with a seat on its front face, an eye bolt extending rearwardly past said flange and having a head provided with an opening into which said lower end of said bracket extends with said seat engaging the forward inner wall of the head of said eye bolt, a spring supported by said bolt and acting against said flange to project said coupling head with said flange normally resting against the lower end of said bracket and means for bearing the compression of said spring.

23. In an automatic train pipe coupling, the combination of a hollow body connected at one end with a coupling head and having at its other end a vertically disposed perforated flange, a pivot device having a perforated head which extends through the perforation of said flange into the hollow of said body, a bracket the lower portion of which terminates in a neck which extends into and pivotally receives the perforated head of said pivot device, said neck having a front wall which diverges rearwardly in the horizontal plane and also having side walls which diverge laterally in the vertical plane above and below said neck, whereby the upper and lower portions of said neck are wider transversely than the center thereof, a spring surrounding said pivot device and bearing upon the rear side of said flange, and an abutment for said spring adjustably mounted upon the rear end of said pivot device.

24. In an automatic train pipe coupling, the combination with a coupling head, a pair of spaced members secured to said head and extending rearwardly thereof, a bracket rigidly secured in position and extending downwardly between said spaced members, a perforated flange or projection secured to said members and adapted to bear against said bracket, a pivot device pivotally connected to said bracket and extending rearwardly thereof, a spring supported by said device and bearing against said projection, said bracket having an integral portion provided with a seat, and said pivot device having a portion hooked over said seat of the bracket.

25. In an automatic train pipe coupling, the combination with a coupling head, a pair of spaced members secured to said head and extending rearwardly thereof, a bracket rigidly secured in position and having at its lower portion an integral neck extending downwardly between said spaced members, said spaced members having a bearing portion adapted to bear against said bracket, a pivot device surrounding and pivotally engaging the neck of said bracket and extending rearwardly thereof, and a spring supported by said device and bearing against said bearing portion connected to said members.

26. In an automatic train pipe connecter, in combination, a bracket having a rear surface and also having a seat with the front face thereof arranged in substantially the same vertical plane as said rear surface of the bracket, a coupling head, a member secured thereto and extending rearwardly and enclosing said bracket and having a portion adapted to engage said rear surface of the bracket, a device pivotally supported on said seat, and a spring for maintaining said device in position and normally pressing said portion against said rear surface of the bracket, the contacting surfaces between said member and said bracket and between said device and said bracket being formed to permit rotation of said member and said device in either direction around said bracket to the extent of at least 90°.

27. In an automatic train pipe connecter, in combination, a bracket having a rear surface and also having at its lower end an elongated portion provided with a seat on its front face, the surface of said seat being in substantially the same vertical plane as said rear face of the bracket, a coupling head, spaced members secured thereto and extending rearwardly on opposite sides of said bracket, a projection to which the rear ends of said members are connected and which is adapted to engage said rear surface of the bracket, a device pivotally supported on said seat and extending rearwardly through said projection and a spring surrounding said device and engaging said projection.

28. In an automatic train pipe connecter, in combination with a car coupler, a bracket rigidly secured to said coupler and extending downwardly therefrom and having a seat on its front face adjacent its lower end, a coupling head, a pair of spaced members secured to said head and extending rearwardly thereof and spanning said bracket, a projection secured to the rear portion of said members for engaging the rear surface of the bracket, a pivot device engaging said seat on the bracket, a coiled spring for holding said device against said seat and said projection against the bracket when said head is free from a mating head, said spaced members and said pivot device being capable of substantially unobstructed rotation from their normal position around said bracket to the extent of at least 90°.

29. In an automatic train pipe connecter, in combination with a car coupler, a bracket rigidly secured thereto and extending downwardly therefrom and having a seat on its front face, a coupling head, a pair of spaced members secured to said head and extending rearwardly on opposite sides of said bracket, a part secured to the rear ends of said members and extending transversely of the bracket, a pivot device surrounding said bracket and engaging said seat and extending rearwardly of the bracket, a spring mounted on said device and engaging said part, said spaced members and said device and spring being capable of rotation together in either direction around said bracket to bring said members into a position transverse to the longitudinal axis of the car coupler.

30. In an automatic train pipe connecter, in combination, a bracket having a rear surface and also having a vertically arranged rearwardly curved portion provided with a seat on its front face, said portion extending rearwardly of a vertical plane passing through said rear surface on the bracket, a coupling head, a member secured thereto and extending rearwardly past said bracket and having a part adapted to engage said rear surface on the bracket, a device pivotally supported on said seat, and a spring for maintaining said device in position and acting to press said part against said rear surface of the bracket.

31. In an automatic train pipe connecter, a bracket, a coupling head, a member connected to said head and extending rearwardly therefrom outside of the bracket and to the rear of the latter, a tie rod pivotally engaging said bracket and extending rearwardly thereof and having an abutment thereon, a spring surrounding said tie rod and arranged between said abutment and the rear end of said member, said head and member being capable of rearward movement to compress said spring when said head contacts with a mating head, the head and member and front end of said spring being capable of substantial vertical movement relative to said bracket and said tie rod when the connecter is in the coupled position.

32. In an automatic train pipe connecter, a bracket, a coiled spring pivotally supported on the bracket and disposed at the rear thereof, a coupling head arranged in front of said bracket, a member connected to said head and spanning said bracket and engaging the front end of said spring, said head and member being adapted to be forced rearwardly to compress said spring when said head encounters a mating head and being movable in a vertical plane relative to the bracket when thus forced rearwardly, the front end of said spring when compressed being capable of flexing and yielding to permit movement of said member and head in a vertical plane relative to said bracket while mating heads are coupled in service.

33. In combination, an automatic train pipe connecter head, a supporting member connected to said head and extending rearwardly and provided at its rear end with a portion having an opening, a bracket extending from above said member downwardly through the same, a tie rod pivotally engaging said bracket and extending rearwardly through said opening, an abutment on the rear end of said rod, a coiled spring surrounding said rod with its rear end seated against said abutment and its front end engaging said portion on the head supporting member, said connecter head and supporting member being held suspended or balanced upon the front end of said spring and being adapted through the flexing or yielding of the coils of said spring to freely move to a substantial extent in a vertical plane relative to said bracket and without movement of said tie rod while said connecter head is coupled to a mating head, whereby said head and member float upon the front end of said spring.

In testimony whereof I affix my signature.

GEORGE E. BALDWIN.